United States Patent [19]
Thomas

[11] Patent Number: 4,640,014
[45] Date of Patent: Feb. 3, 1987

[54] DIMENSIONAL CHECKING TOOL

[75] Inventor: Arthur Thomas, Liverpool, England

[73] Assignee: Ford Motor Company, Dearborn, Mich.

[21] Appl. No.: 818,840

[22] Filed: Jan. 14, 1986

[30] Foreign Application Priority Data

Jan. 15, 1985 [GB] United Kingdom ............... 8500962

[51] Int. Cl.$^4$ .................................................. G01B 7/14
[52] U.S. Cl. ............................. 33/143 L; 33/147 K; 33/169 B; 33/557
[58] Field of Search ............ 33/143 L, 147 K, 169 B, 33/147 N, 143 F, 172 E, 178 R, 143 K, 148 H, 557

[56] References Cited

U.S. PATENT DOCUMENTS

| | | | |
|---|---|---|---|
| 3,987,552 | 10/1976 | Raiteri | 33/143 L |
| 4,240,206 | 12/1980 | Baresh et al. | 33/143 L |
| 4,345,380 | 8/1982 | Vis | 33/147 N |
| 4,536,964 | 8/1985 | Lazes | 33/169 B |
| 4,554,742 | 11/1985 | Freitag | 33/169 B |

Primary Examiner—Willis Little
Attorney, Agent, or Firm—Peter Abolins; Keith L. Zerschling

[57] ABSTRACT

A dimensional checking tool for checking the "flush" and "gap" dimensions around a pressed panel has two probes 20 and 22 which move into and out of a housing 10, and are biassed in an outward direction, against the surfaces of a panel 34. Transducers or other devices 38 and 44 are sensitive to the positions of the probes and provide signals representative of the probe positions and which can be passed from the tool to an external data capture system.

7 Claims, 4 Drawing Figures

DIMENSIONAL CHECKING TOOL

This invention relates to a dimensional checking tool for checking dimensions of sheet metal pressings on a jig. The tool is particularly intended for checking the dimensions of motor vehicle body panels on a jig known as a checking fixture.

Two measurements have to be made at several points around the edge of a body panel. These measurements are known as "gap" and "flush". "Gap" refers to the spacing between the edge of the panel and an adjacent fixed part of the fixture. "Flush" refers to the position of the plane of the panel at its edge, relative to a surface plane of an adjacent fixed part of the fixture.

Conventionally these measurements have been made manually by an operator using a feeler gauge for the "gap" measurement, and a straight edge for the "flush" measurement. Such a system requires some considerable accuracy on the part of the operator and is open to considerable possible variation between one operator and another as to the tolerances which are accepted.

According to the present invention, there is provided a dimensional checking tool having a housing to be held in the hand, locating means for locating the housing at a fixed point on a jig, first and second movable probes linearly movable into and out of the housing along different paths, means biassing the probes in a direction outwardly of the housing and means for indicating the positions of the probes relative to the housing.

The different paths along which the probes move are preferably at right angles to each other so that one probe measures "gap" and the other probe measures "flush".

The tool preferably includes linear transducers which respond to linear movement of the probes and provide a signal indicative of the instantaneous positions of the probes. A switch can be provided for operation when the tool is fully located, to allow signals from the transducers to be passed from the tool to a remote data capture location. The switch can for example be a push button.

One of the probes is preferably connected to a lever by which it can be withdrawn into the housing to enable the tool to be applied to the pressing to be checked. Once the tool is correctly seated, the lever can be released to allow the probe to move out of the housing against the pressing.

The locating means may be a pin projecting from the housing. A third probe may be associated with the pin and arranged so as to indicate when the pin is fully seated in a bore in a locating block fixed on the jig. The third probe may act on an additional linear transducer which will provide a signal indicating proper seating of the tool.

The housing is preferably made in two easily separable parts, with the transducers mounted inside the housing and accessible on separation of the housing parts.

The tool is particularly suitable for use in a computerised data capture system as the probe position signals from the transducers can be fed directly to a computer. Specifically the system can form part of a statistical process control system.

The invention extends to a dimensional checking system including a tool as set forth above and zeroing and calibration blocks, the blocks including location fittings for cooperation with the location means on the tool housing, the zeroing block including an abutment having faces in positions corresponding to zero gap and zero flush measurements and the calibration block having location fittings and a similar abutment with the faces on the calibration block abutment being at a fixed, known gap and flush dimension.

The invention will now be further described, by way of example, with reference to the accompanying drawings, in which.

Figure 1:
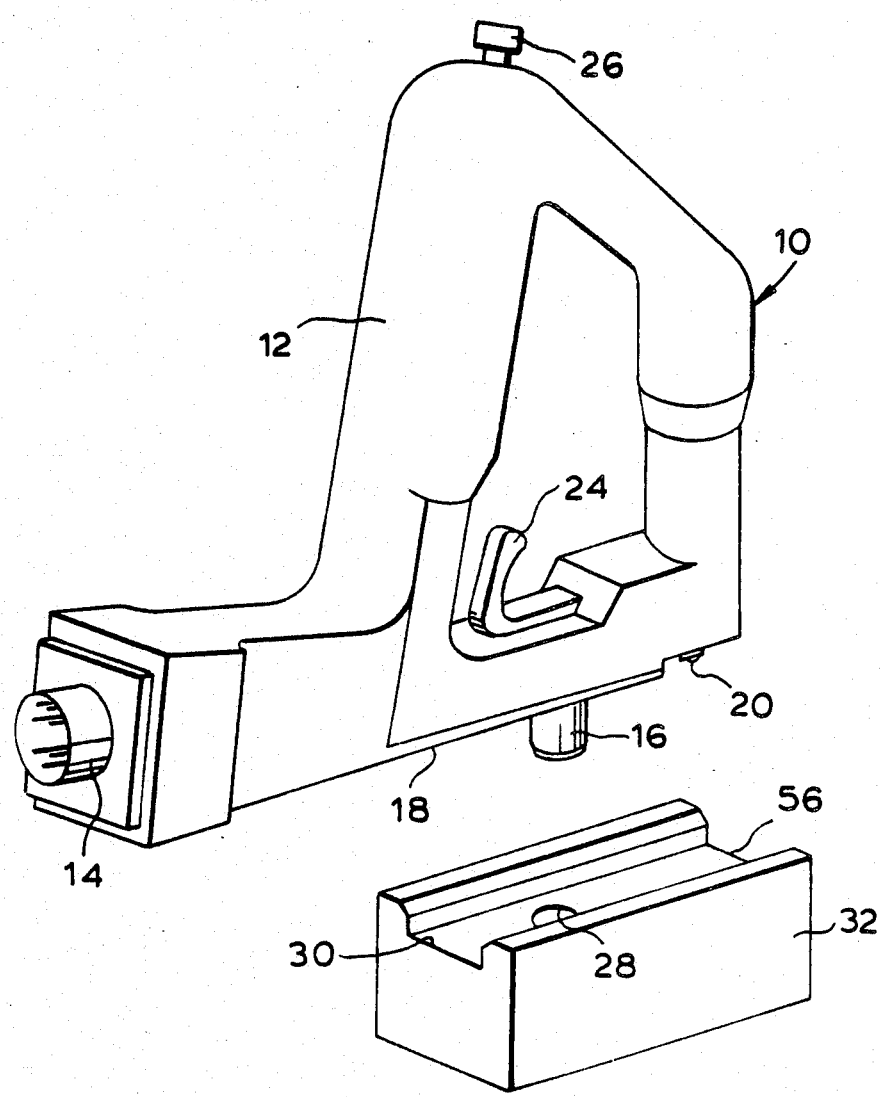
FIG. 1 is a perspective view of a tool in accordance with the invention together with a location fitting.

The tool shown in FIG. 1 has a housing 10 which forms a grip portion 12 and which has a multiplug socket 14 for connection to an appropriate data handling system. A locating pin 16 projects from a flat bottom face 18 of the housing and two probes 20 and 22 (only the probe 20 is visible in FIG. 1) extend from one corner of the housing.

A trigger 24 allows the probe 22 to be manually retracted, against spring pressure.

A push-button 26 is provided which can be pushed when the tool is correctly positioned in a checking fixture, in order to pass data via the socket 14 to a connected data handling system.

The locating pin 16 fits into a bore 28 at the bottom of a channel 30 in a locating block 32 which will be fixed to a position on a panel checking fixture. Such a checking fixture allows a pressed panel to be laid on it in a particular orientation, with the edges of the panel close to a number of locating blocks 32 permanently attached to the fixture around the panel periphery. The locating blocks thus form datum points against which the actual panel dimensions can be checked.

Figure 2:
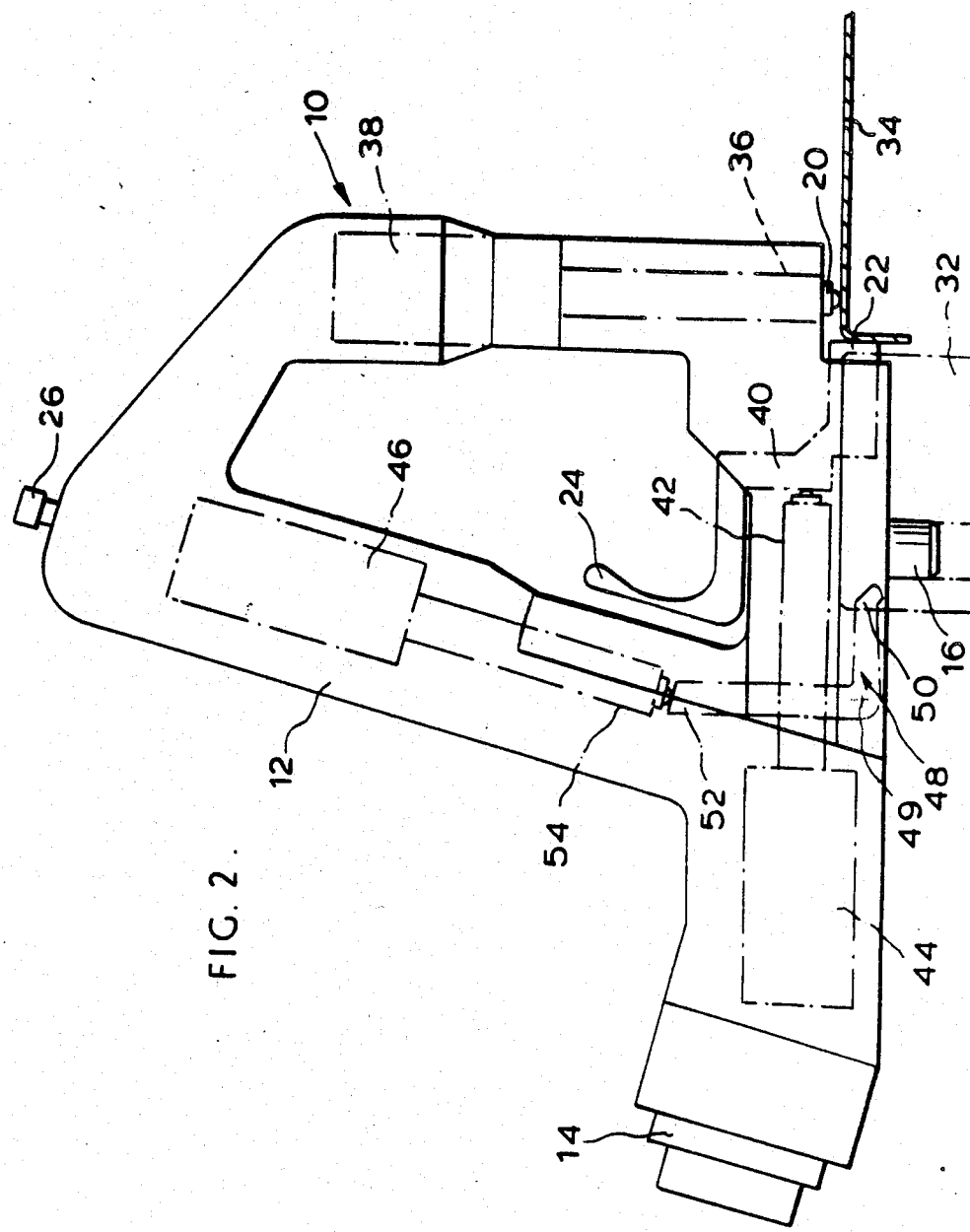
FIG. 2 is a side view of the tool of FIG. 1.

The operating features of the tool are shown more clearly in FIG. 2, where the edge of a panel to be checked is indicated at 34. The probe 22 measures the "gap" dimension, and the probe 20 measures the "flush" dimension.

The probe 20 is formed by the tip of a transducer shaft 36, with the transducer body 38 contained in the housing 10. The shaft 36 is biassed in a direction away from the body 38, and out of the housing.

The probe 22 is formed at one end of a slide 40, the other end of which forms the trigger 24. The shaft 42 of a second transducer 44 acts against the slide 40 and the biassing of the shaft 42 urges the slide out of the housing.

A third transducer 46 is used to check that the tool is correctly seated in the locating block 32. A lever 48 mounted in the housing and pivoted on an axis 49, has one arm 50 which contacts the bottom of the channel 30 and another arm 52 which is biassed through the shaft 54 of the third transducer.

To position the tool in the locating block 32, the pin 16 is introduced to the bore 28 whilst holding the trigger 24 so that the probe 22 is retracted. The tool is pushed fully home so that the base 18 of the tool bottoms in the channel 30. The sides of the channel 30 engage with the sides of the tool base 18 to ensure correct lateral positioning of the tool. The trigger 24 is then released to allow the probe 22 to move out against the edge flange of the panel 34. Whilst the tool is being pushed into the block 32, the probe 20 will be pushed back into the housing 10 by contact with the panel 34.

To produce a measurement signal the button 26 is depressed to connect the transducers 38, 44 and 46 to a power source. The circuitry will be arranged so that power is only applied to the transducers 38 and 44 if the condition of the transducer 46 indicates that the tool is fully home in the block 32. Once power is applied, the transducers will be energised and a position signal will be produced which will be passed via the socket 14 to a suitable data storage/processing system.

The tool is quick and easy to apply to each location block around a checking fixture, and it measures gap and flush dimensions simultaneously and accurately without any scope for human error.

It is possible for the tool to be used together with properly designed and positioned location blocks to produce location repeatability better than 0.025 mm. The system can be arranged to measure over a total range of 5 mm in both the gap and flush planes.

The transducers 38, 44 and 46 are driven by DC current and give out a DC signal. They can thus be driven by battery power which enables the tool to be completely portable. In a particularly convenient application, the tool is connected to a portable, battery powered computer such as a HUSKY A/D computer sold by Husky Computers Limited, to which the transducer signals are passed.

The housing 10 is made in two halves which can be separated to allow access to the transducers and to the other working parts to allow easy replacement should any of these parts fail.

The location blocks 32 are clearly important in enabling accurate measurements to be obtained. The important features of the block are
(1) the diameter of the bore 28
(2) the width of the channel 30
(3) the positional relationship between the bore 28 and the channel 30
(4) the positional relationship between the bore 28 and the end face 56 of the block.

In addition the underside of the block may have a blind, tapped hole (not shown) which is used for keying when the block is bonded into the checking fixture.

For any particular part to be checked, a location block 32 is implanted into the checking fixture at each measuring point, accurately positioned to fulfill measuring accuracy and to optimise the 5 mm measuring range of the tool.

Figure 3:
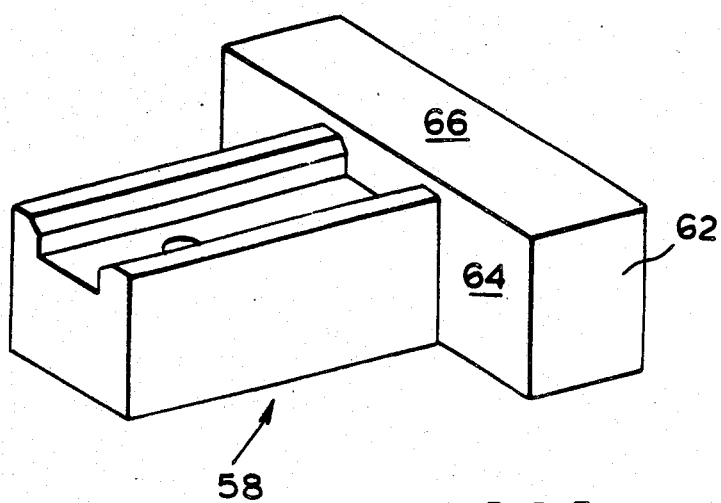
FIGS. 3 and 4 show zeroing and calibration blocks for use in a dimensional checking system in accordance with the invention.
Figure 4:
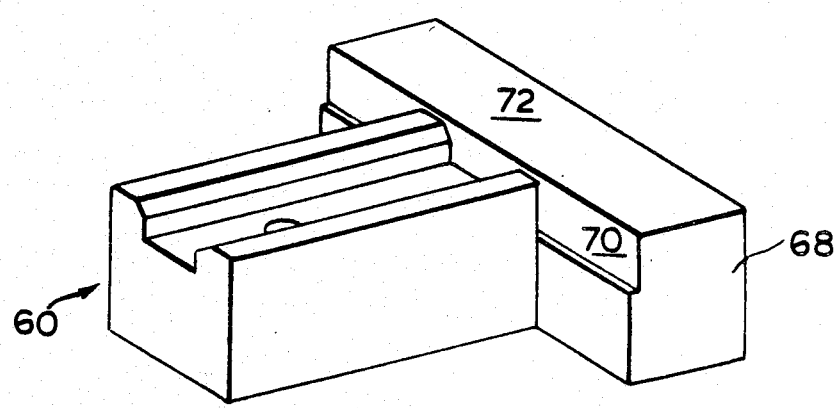

It is necessary to calibrate the tool before use and after any component has been replaced or repaired. To do this, a zero block 58 and a calibration block 60 are used, and these blocks are shown in FIGS. 3 and 4. Both the zero and calibration blocks 58 and 60 are essentially location blocks with end pieces fixed to them. The end piece 62 on the zero block has faces 64 and 66 which are positioned relative to the bore 28 so as to represent zero values of gap and flush respectively. The end piece 68 on the calibration block 60 has faces 70 and 72 which are positioned to represent an accurately known gap and flush measurement, e.g. 1.00 mm.

A zero block 58 will be fitted at a convenient position on each checking fixture to zero the data-processing computer as required during the measuring procedure. The tool can be inserted in the zeroing block to provide a known zero reading at any required time. The end piece 62 either simulates directly the zero measuring situation, or provides datum readings from which the zero measuring situation can be calculated via computer software.

The calibration block 60 is used in the tool maintenance area to calibrate the transducers. A tool requiring calibration is first zeroed using a zero block 58. The tool is then inserted in a calibration block so that a computer connected to the transducers can calculate the calibration factor to be applied to measurements taken during operation.

I claim:

1. A dimensional checking tool for checking a pressing, said tool having a housing to be held in the hand, locating means for locating the housing at a fixed point on a jig, first and second movable probes linearly movable into and out of the housing along different paths, means biasing the probes in a direction outwardly of the housing and means for indicating the positions of the probes relative to the housing, wherein the different paths along which the probes move are at right angles to each other so that one probe measures "gap" and the other probe measures "flush";

wherein the means for indicating the positions of the probes comprise linear transducers which respond to linear movement of the probes and provide a signal indicative of the instantaneous positions of the probes;

wherein a switch is provided for operation when the tool is fully located, to allow signals from the transducers to be passed from the tool to a remote data capture location;

wherein the switch is a push on/release off button; and wherein one of the probes is connected to a manually movable slide by which it can be withdrawn into the housing to enable the tool to be applied to the pressing to be checked.

2. A tool as claimed in claim 1, wherein the locating means is a pin projecting from the housing.

3. A tool as claimed in claim 2, wherein a third probe is associated with the pin and arranged so as to indicate when the pin is fully seated in a bore in a locating block fixed on the jig.

4. A tool as claimed in claim 3, wherein the third probe acts on an additional linear transducer which will provide a signal indicating proper seating of the tool and which will inhibit any signal output from the tool unless the tool is properly seated.

5. A tool as claimed in claim 4, wherein the housing is made in two easily separable parts, with working parts mounted inside the housing and accessible on separation of the housing parts.

6. A dimensional checking system including a dimensional checking tool and zeroing and calibration blocks, said dimensional checking tool having a housing to be held in the hand, locating means for locating the housing at a fixed point on a jig, first and second movable probes linearly movable into and out of the housing along different paths which are at right angles to each other so that one probe measures "gap" and the other probe measures "flush", said means for indicating the positions of the probes relative to the housing including linear transducers which respond to linear movement of the probes and provide a signal indicative of the instantaneous positions of the probes, one of said probes being connected to a manually movable slide by which said probe can be withdrawn into the housing to enable the tool to be applied to the pressing to be checked, said locating means being a pin projecting from the housing, a third probe being associated with said pin and arranged so as to indicate when the pin is fully seated in a bore in a locating block fixed on the jig, said third probe acting as an additional linear transducer which provides a signal indicating proper seating of said tool and which will inhibit any signal output from said tool unless said tool is properly seated; and the blocks including locating fittings for cooperation with the locating means on the tool housing, the zeroing block including an abutment having faces in positions corresponding to zero gap and zero flush measurements and the calibration block having location fittings and a similar abutment with the faces on the calibration block abutment being at a fixed, known gap and flush dimension relative to the tool home position in the block.

7. A dimensional checking system as claimed in claim 6, a battery for powering the transducers of the tool and a portable computer arranged to receive data from the transducers.

* * * * *